(12) United States Patent
Ma et al.

(10) Patent No.: US 8,562,697 B2
(45) Date of Patent: Oct. 22, 2013

(54) PROCESS FOR HYDROLYSED REFORMING OF LIQUOUS CELLULOSE BIOMASS TO PRODUCE BIO-GASOLINE

(75) Inventors: Longlong Ma, Guangdong (CN); Tiejun Wang, Guangdong (CN); Zhenhong Yuan, Guangdong (CN); Xinghua Zhang, Guangdong (CN); Xinshu Zhuang, Guangdong (CN); Chuangzhi Wu, Guangdong (CN); Ting Jiang, Guangdong (CN); Qing Zhang, Guangdong (CN)

(73) Assignee: Guangzhou Institute of Energy Conversion, Chinese Academy of Sciences (CN)

( * ) Notice: Subject to any disclaimer, the term of this patent is extended or adjusted under 35 U.S.C. 154(b) by 32 days.

(21) Appl. No.: 13/497,939

(22) PCT Filed: Mar. 25, 2010

(86) PCT No.: PCT/CN2010/071310
§ 371 (c)(1),
(2), (4) Date: Mar. 23, 2012

(87) PCT Pub. No.: WO2011/035571
PCT Pub. Date: Mar. 31, 2011

(65) Prior Publication Data
US 2012/0216451 A1 Aug. 30, 2012

(30) Foreign Application Priority Data
Sep. 24, 2009 (CN) .......................... 2009 1 0192651

(51) Int. Cl.
*C10L 1/00* (2006.01)
(52) U.S. Cl.
USPC .......................................................... 44/307

(58) Field of Classification Search
USPC .............................................. 44/307; 585/739
See application file for complete search history.

(56) References Cited

U.S. PATENT DOCUMENTS 4,501,926 A * 2/1985 LaPierre et al. .............. 585/739

FOREIGN PATENT DOCUMENTS

CN 1385508 A * 12/2002

* cited by examiner

*Primary Examiner* — James Goloboy
*Assistant Examiner* — Chantel Graham
(74) *Attorney, Agent, or Firm* — Lerner, David, Littenberg, Krumholz & Mentlik, LLP

(57) ABSTRACT

The invention discloses a process for hydrolyzed reforming of the ligneous cellulose biomass to produce bio-gasoline, which directly transfers the hydrolyzed-material liquid obtained from ligneous cellulose biomass through hydrolyzing into aqueous catalytic reforming system, the feed subjects to aqueous catalytic reaction in low-temperature reforming reactor filled with catalyst $Ni/SiO_2$—$Al_2O_3$ and in high-temperature reforming reactor filled with catalyst Ni/HZSM-5 in turn, the reactant is condensed and phase-separated: uncondensed bio-gasoline is absorbed by absorption liquid-C6 alkane, condensed liquid is phase-separated through phase-separator, bio-gasoline is obtained in the upper layer of the phase-separator. The invention creates a new process for producing high-quality liquid fuel oil using biomass as feedstock, which can automatically layer and separate, omitting the step of rectifying and purifying product. The feedstock is cheap and broadly available. The product can directly used in the present vehicle-carried engine system, and have prosperous market prospect.

6 Claims, 1 Drawing Sheet

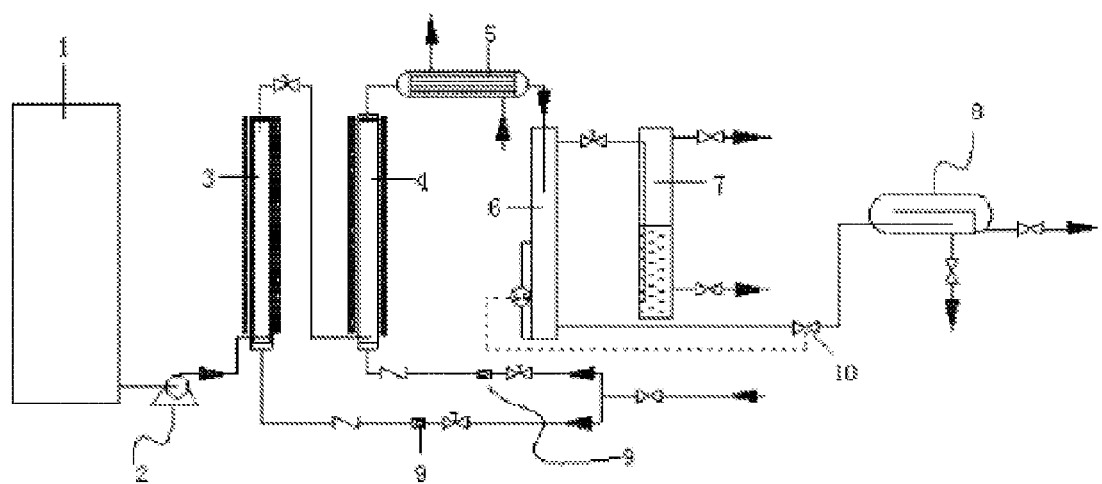

PROCESS FOR HYDROLYSED REFORMING OF LIQUOUS CELLULOSE BIOMASS TO PRODUCE BIO-GASOLINE

CROSS-REFERENCE TO RELATED APPLICATIONS

The present application is a national phase entry under 35 U.S.C. §371 of International Application No. PCT/CN2010/071310 filed Mar. 25, 2010, published on Mar. 31, 2011, as WO 2011/035571 A1, which claims priority from Chinese Patent Application No. 200910192651.4, filed Sep. 24, 2009, all of which is incorporated herein by reference.

FIELD OF THE INVENTION

The present invention relates to the filed of biomass energy and chemical engineering, in particular to a process for hydrolyzed reforming of lignocellulose biomass to produce bio-gasoline.

DESCRIPTION OF THE PRIOR ART

Lignocellulose biomass includes wastes and residues from agricultural production, wastes from forestry and timber processing, grasses, etc., which is the most abundant renewable resources on the earth. Its main organic constituents comprise cellulose, hemicellulose, and lignose. Cellulose can be hydrolyzed to glucose, and hemicellulose can be hydrolyzed to xylose, arabinose, and galactose. Hydrolysis is one of the key steps of the development and utilization of biomass resources, such as lignocellulose.

High temperature liquid water typically refers to the pressurized liquid water between 180~350° C., which not only has functions of acid catalysis and base catalysis, but also can dissolve organics and inorganics at the same time. It has attracted extensive attention because of its features, including fast reaction rate, good capability to dissolve, its own functions of acid catalysis and base catalysis, selective decomposition, and capability of inhibiting pyrolytic coking. The hydrolysis of biomass resources by means of high temperature liquid water to produce chemical raw materials has advantages in that there is no catalyst to be recovered, the water can be recycled, and the contamination is light. It has shown bright prospect for applications in the field of biomass resources.

Acidic hydrolysis can directly hydrolyze lignocellulose biomass to monosaccharides, which is operationally easy and economically feasible. Extremely low acid hydrolysis is a new process for acid hydrolysis of biomass, which uses an acid (usually a strong acid, such as sulfuric acid, hydrochloric acid, etc.) with concentration lower than 0.1% as the catalyst to hydrolyze biomass to monosaccharide and oligosaccharide. In an acidic medium, however, monosaccharide can easily degrade to produce substances, such as pyromucic aldehyde and HMF, that have certain side effect on subsequent aqueous phase catalytic reforming reaction (easy to polymerize and deactivate the catalyst). Therefore, it is typically necessary to perform proper detoxication on dilute acid hydrolysis solutions.

Aqueous phase catalytic reforming is a new process that catalyzes ingredients in lignocellulose biomass hydrolysis solution to prepare liquid alkanes. This process requires relatively mild reaction conditions. It has been reported that under the action of a noble metal catalyst such as Pt, at 200~300° C. and under around 2 MPa, the conversion rate of monosaccharide in the aqueous phase can reach above 85 wt %. Aqueous reforming products are bio-gasoline with $C_5$ and $C_6$ alkanes as main constituents, which can be added into gasoline for vehicles at a high percentage. They have higher energy efficiency than conventional ethanol gasoline, are suitable for any regular vehicles or ethanol gas-powered vehicles, and do not require changes to the design of vehicle engines or the manufacture of special gas mixing equipment. Furthermore, hydrocarbons in aqueous phase reformed hydrolysis solution have a potential advantage: high thermal efficiency. All reactions proceed in the liquid phase, which avoids the vaporization of raw materials; the reaction product hydrocarbon can automatically separate from the aqueous phase, which avoids distillation and other energy-consuming processes. It is estimated that the thermal efficiency of said process is about 2 times of that of ethanol preparation through hydrocarbon fermentation; in 2006, Science published a special review that highly evaluated said process as a new pathway to utilize agricultural and forestry wastes—from biomass to gasoline, which produces basic chemicals from renewable resources and creates opportunities for orderly and sustainable transformation of economies. As a result, it has attracted great attention from academia, industries and businesses.

However, aqueous phase catalytic reforming is currently carried out mainly through processes with complicated 4-phase catalytic reactors as the core thereof, which require very complex conditions; moreover, the noble metal catalysts used therein are very expensive, making it economically difficult; furthermore, there is the drawback that the catalysts tend to accumulate carbon and become deactivated, leading to a short service life.

SUMMARY OF THE INVENTION

The object of the present invention is to overcome the drawbacks of the prior art, and to provide a new process for hydrolysis and catalytic reforming of lignocellulose biomass as the raw material to produce bio-gasoline.

To attain the above object, the present invention adopts the following technology:

A process for hydrolyzed reforming of lignocellulose biomass to produce bio-gasoline, comprising the following steps:
(1) Hydrolyze the lignocellulose biomass to obtain hydrolyzed raw material solution;
(2) The hydrolyzed raw material solution enters a low-temperature reforming reactor filled with $Ni/Al_2O_3$—$SiO_2$ catalyst, and reacts at 160-210° C. and under 4.0~6.5 MPa hydrogen;
(3) The reactant from the low-temperature reforming reactor enters a high-temperature reforming reactor filled with Ni/HZSM-5 catalyst, and reacts at 210-270° C. and under 2.0~5.6 MPa hydrogen;
(4) The reactant from the high-temperature reforming reactor undergoes gas-liquid separation after being condensed, and uncondensed bio-gasoline is decompressed and adsorbed by $C_6$ alkane absorption liquid; the liquid undergoes phase separation through a phase separator, and the bio-gasoline is obtained at the upper layer of the phase separator.

The hydrolyzed raw material solution in said Step (1) is obtained through the following steps:
a) Lignocellulose biomass is hydrolyzed in a high temperature liquid water medium under 2.0-5.0 MPa for 40~90 min and then filtered, and the filtrate is the high temperature liquid water hydrolysis solution;
b) The residue after the filtration in Step a) is hydrolyzed in a maleic acid solution with the mass concentration of 0.01-0.1% at 160-220° C. and under 2.0~5.0 MPa for 10~30 min, and the filtrate is the maleic acid hydrolysis solution;

c) The high temperature liquid water hydrolysis solution in Step a) and the maleic acid hydrolysis solution in Step b) are mixed to obtain the hydrolyzed raw material solution.

Preferably, the temperature of said high temperature liquid water is 180~200° C. In such a temperature range, hemicellulose in the biomass can complete hydrolysis at a relatively fast rate without being overly hydrolyzed;

Preferably, the mass concentration of said extremely low maleic acid is 0.06-0.08%. In such a concentration range, cellulose in the biomass can effectively complete hydrolysis without being overly hydrolyzed.

Preferably, the reaction conditions in said Step (2) are 190~200° C. and 5.0 MPa hydrogen.

Preferably, the reaction conditions in said Step (3) are 240~250° C. and 4.0 MPa hydrogen.

Compared with the prior art, the present invention has the following advantageous effects:

1. The present invention uses cheap Ni-based catalysts and directly processes the hydrolyzed raw material solution with a two-stage aqueous phase catalytic reforming process to prepare bio-gasoline. The process is simple. Some organics with active nature are converted at the low-temperature stage with the addition of hydrogen, which avoids polymerization, coking and carbon accumulation at the high temperature stage. Consequently, it avoids disadvantageous factors that the catalyst tends to accumulate carbon and becomes deactivated; furthermore, the product can automatically layer and separate, which avoids rectification and purification of the product.

2. The present invention uses lignocellulose biomass as raw material to prepare bio-gasoline. The raw material has abundant supplies and low prices. The product can be directly used on existing vehicle engine systems and has a bright market prospect, which results in a new method for preparing high-quality liquid fuel with biomass as raw material.

3. The present invention uses high temperature liquid water and extremely low weak acid—maleic acid to jointly hydrolyze biomass, such that the biomass is thoroughly hydrolyzed. Since maleic acid has very low acidity, moreover, it lessens corrosion to equipment. The hydrolyzed raw material solution does not need to go through detoxication but can directly enter the catalytic reforming system to prepare bio-gasoline through aqueous phase catalytic reforming.

BRIEF DESCRIPTION OF THE DRAWINGS

FIG. 1 illustrates the flow of the process according to the present invention that prepares bio-gasoline through aqueous phase catalytic reforming of hydrolyzed raw material solution:

Legends in the drawing: 1. hydrolysis solution tank; 2. metering injection pump; 3. low-temperature reforming reactor; 4. high-temperature reforming reactor; 5. condenser; 6. gas-liquid separator; 7. absorption tank; 8. phase separator; 9. hydrogen flowmeter; 10. liquid level control solenoid.

DETAILED DESCRIPTION OF THE PREFERRED EMBODIMENT

The present invention will be further described in detail below with reference to the examples, which, however, are not intended to restrict the present invention.

Examples 1-3 are methods to prepare the hydrolyzed raw material solution from joint hydrolysis by high temperature liquid water and extremely low maleic acid.

EXAMPLE 1

A method for preparing the hydrolyzed raw material solution comprises the following steps:

(1) Add 20 g sawdust in 500 ml high temperature liquid water at 200° C. and 5.0 MPa for 90 min of hydrolysis; when the hydrolysis is completed, filter, and the filtrate (i.e. high temperature liquid water hydrolysis solution) directly enters the hydrolysis solution tank 1, (2) The hydrolysis residue after the filtration continues to be hydrolyzed in 500 ml extremely low maleic acid solution with concentration of 0.1 wt. % for 30 min (hydrolysis conditions: 220° C. and 5.0 MPa), and then filter; the filtrate is the extremely low maleic acid hydrolysis solution;

(3) Discard lignose that has not been hydrolyzed, and the extremely low maleic acid hydrolysis solution enters the hydrolysis solution tank 1 to be mixed with the high temperature liquid water hydrolysis solution to form the hydrolyzed raw material solution.

EXAMPLE 2

A method for preparing the hydrolyzed raw material solution, the high temperature liquid water has a temperature of 200° C. and pressure of 4.0 MPa, and the hydrolysis time is 65 min; the maleic acid solution has a concentration of 0.06 wt. %, 190° C. and 3.0 MPa, and the hydrolysis time is 15 min. Other operation modes and reaction conditions are the same as those in Example 1.

EXAMPLE 3

A method for preparing the hydrolyzed raw material solution, the high temperature liquid water has a temperature of 180° C. and pressure of 2.0 MPa, and the hydrolysis time is 40 min; the maleic acid solution has a concentration of 0.01 wt. %, 160° C. and 2.0 MPa, and the hydrolysis time is 10 min. Other operation modes and reaction conditions are the same as those in Example 1.

Measure the hydrolysis results in Examples 1-3 with the results listed in Table 1. It can be seen from Table 1 that: Example 2 has relatively ideal results. Its hydrolysis conditions are relatively mild. Although its total conversion rate is not as good as that in Example 1, it has the highest monosaccharide concentration in the hydrolysis solution, which is beneficial for subsequent aqueous phase catalytic reforming reaction.

TABLE 1

| Hydrolysis Results of All Examples | | |
|---|---|---|
| | Total conversion rate (wt. %) | Monosaccharide concentration (g/L) |
| Example 1 | 60.6 | 8.19 |
| Example 2 | 53.8 | 9.69 |
| Example 3 | 39.7 | 7.11 |

In Examples 4-6, aqueous phase catalytic reforming reaction is performed on the hydrolyzed raw material solution obtained from Example 2 as the raw material.

EXAMPLE 4

A method for preparing bio-gasoline through aqueous phase catalytic reforming of the hydrolyzed raw material solution comprises the following steps:

(1) The hydrolyzed raw material solution enters the low-temperature reforming reactor 3 filled with Ni/Al$_2$O$_3$—SiO$_2$ catalyst via the metering injection pump 2 from the bottom of the low-temperature reforming reactor 3, and enters the catalyst bed layer as carried by a H$_2$ flow for reaction. The reaction temperature is 190° C. and the hydrogen pressure is 5.0 MPa.

(2) Under the action of pressure difference, the reactant from the low-temperature reforming reactor 3 directly enters the high-temperature reforming reactor 4 filled with Ni/HZSM-5 catalyst from the bottom of the high-temperature reforming reactor 4, and enters the catalyst bed layer as carried by a H$_2$ flow for reaction. The reaction temperature is 240° C. and the hydrogen pressure is 4.0 MPa.

(3) The reactant from the high-temperature reforming reactor 4 undergoes gas-liquid separation after being condensed, which directly enters the gas-liquid separator 6 after the condenser 5, hydrogen and uncondensed reaction product (bio-gasoline) are discharged from the top portion of the gas-liquid separator 6 and decompressed, and then enter the absorption tank 7; the absorption liquid is C$_6$ alkane, and the unabsorbed gas is discharged from an outlet on the top of the absorption tank 7.

(4) Liquid (water, reaction products and un-reacted saccharides and polyols) at the bottom of the gas-liquid separator 6 is gradually accumulated. When the liquid level rises to a set value, the liquid level control solenoid 10 is automatically opened. The liquid enters the phase separator 8 for phase separation; the aqueous phase consisted of water, polyols and un-reacted saccharides is in the lower layer of the phase separator 8, while the reaction product (bio-gasoline) is in the upper layer of the phase separator 8.

EXAMPLE 5

A method for preparing bio-gasoline through catalytic reforming of the hydrolyzed raw material solution, the temperature of the low-temperature reforming reactor is 160° C. and the pressure is 4.0 MPa, the temperature of the high-temperature reforming reactor is 210° C. and the pressure is 2.0 MPa, and all other operation modes and reaction conditions are the same as those in Example 4.

EXAMPLE 6

A method for preparing bio-gasoline through catalytic reforming of the hydrolyzed raw material solution, the temperature of the low-temperature reforming reactor is 210° C. and the pressure is 6.5 MPa, the temperature of the high-temperature reforming reactor is 270° C. and the pressure is 5.6 MPa, and all other operation modes and reaction conditions are the same as those in Example 4.

Measure the total carbon conversion rate in the hydrolyzed raw material solution and product distribution after the catalysis reaction in Examples 4-6. The results are listed in Table 2. It can be seen from Table 2 that: the hydrolyzed raw material solution has the highest total carbon conversion rate when the temperature of the low-temperature reforming reactor is 190° C. and the pressure is 5.0 MPa, the temperature of the high-temperature reforming reactor is 240° C. and the pressure is 4.0 MPa (i.e. reaction conditions in Example 4), and the total content of C$_5$, C$_6$, and C$_7$ in the product is 74.9% (mol percentage). Under this aqueous phase reforming process, the carbon conversion rate in the hydrolysis solution and the selectivity of C$_5$, C$_6$, and C$_7$ in the product reach a good combination, and the yield of bio-gasoline under such a process is the highest.

TABLE 2

Results of Aqueous Phase Catalytic Reforming Reaction of Hydrolyzed Raw Material Solution

| | Carbon conversion rate in the hydrolysis solution mol % | ≤C$_4$ mol % | C$_5$ mol % | C$_6$ mol % | C$_7$ mol % |
|---|---|---|---|---|---|
| Example 4 | 71.7 | 25.1 | 35.2 | 36.6 | 3.1 |
| Example 5 | 61.1 | 17.3 | 31.8 | 48.9 | 2.0 |
| Example 6 | 73.9 | 32.7 | 36.1 | 29.5 | 1.7 |

The invention claimed is:

1. A process for hydrolyzed reforming of lignocellulose biomass to produce bio-gasoline, characterized in that it comprises the following steps:
   (1) Hydrolyze the lignocellulose biomass to obtain hydrolyzed raw material solution;
   (2) The hydrolyzed raw material solution enters a low-temperature reforming reactor filled with Ni/Al$_2$O$_3$—SiO$_2$ catalyst, and reacts at 160-210° C. and under 4.0~6.5 MPa hydrogen;
   (3) The reactant from the low-temperature reforming reactor enters a high-temperature reforming reactor filled with Ni/HZSM-5 catalyst, and reacts at 210-270° C. and under 2.0~5.6 MPa hydrogen;
   (4) The reactant from the high-temperature reforming reactor undergoes gas-liquid separation after being condensed, and uncondensed bio-gasoline is decompressed and adsorbed by C$_6$ alkane absorption liquid; the liquid undergoes phase separation through a phase separator, and the bio-gasoline is obtained at the upper layer of the phase separator.

2. The process for hydrolyzed reforming of lignocellulose biomass to produce bio-gasoline as set forth in claim 1, characterized in that the hydrolyzed raw material solution in said Step (1) is obtained through the following steps:
   a) Lignocellulose biomass is hydrolyzed in a high temperature liquid water medium under 2.0-5.0 MPa for 40~90 min and then filtered, and the filtrate is the high temperature liquid water hydrolysis solution;
   b) The residue after the filtration in Step a) is hydrolyzed in a maleic acid solution with the mass concentration of 0.01-0.1% at 160-220° C. and under 2.0~5.0 MPa for 10~30 min, and the filtrate is the maleic acid hydrolysis solution;
   c) The high temperature liquid water hydrolysis solution in Step a) and the maleic acid hydrolysis solution in Step b) are mixed to obtain the hydrolyzed raw material solution.

3. The process for hydrolyzed reforming of lignocellulose biomass to produce bio-gasoline as set forth in claim 2, characterized in that the temperature of said high temperature liquid water is 180~200° C.

4. The process for hydrolyzed reforming of lignocellulose biomass to produce bio-gasoline as set forth in claim 2, characterized in that the mass concentration of said maleic acid is 0.06-0.08%.

5. The process for hydrolyzed reforming of lignocellulose biomass to produce bio-gasoline as set forth in claim 1, characterized in that the reaction conditions in said Step (2) are 190~200° C. and 5.0 MPa hydrogen.

6. The process for hydrolyzed reforming of lignocellulose biomass to produce bio-gasoline as set forth in claim 1, characterized in that the reaction conditions in said Step (3) are 240~250° C. and 4.0 MPa hydrogen.

* * * * *